(12) United States Patent
Zhang et al.

(10) Patent No.: US 12,549,651 B2
(45) Date of Patent: Feb. 10, 2026

(54) FOLDING ASSEMBLY AND FOLDABLE ELECTRONIC DEVICE

(71) Applicant: HONOR DEVICE CO., LTD., Shenzhen (CN)

(72) Inventors: Yaolei Zhang, Shenzhen (CN); Zhengping Tan, Shenzhen (CN); Mingqian Gao, Shenzhen (CN); Yuan Wang, Shenzhen (CN); Haifei Li, Shenzhen (CN); Guotong Zhou, Shenzhen (CN); Leibo Yuan, Shenzhen (CN); Bin Yan, Shenzhen (CN); Kuibing Zhao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 320 days.

(21) Appl. No.: 18/268,038

(22) PCT Filed: Jan. 11, 2022

(86) PCT No.: PCT/CN2022/071460
§ 371 (c)(1),
(2) Date: Jun. 16, 2023

(87) PCT Pub. No.: WO2022/152135
PCT Pub. Date: Jul. 21, 2022

(65) Prior Publication Data
US 2024/0073303 A1 Feb. 29, 2024

(30) Foreign Application Priority Data

Jan. 14, 2021 (CN) .......................... 202110050482.1
Mar. 2, 2021 (CN) .......................... 202110230558.9

(51) Int. Cl.
*H04M 1/02* (2006.01)

(52) U.S. Cl.
CPC ....... *H04M 1/0216* (2013.01); *H04M 1/0268* (2013.01)

(58) Field of Classification Search
CPC .. H04M 1/0216; H04M 1/0268; H04M 1/026; G06F 1/1616; G06F 1/1652; G06F 1/1681
See application file for complete search history.

(56) References Cited

U.S. PATENT DOCUMENTS

| 11,336,759 B2 | 5/2022 | Liao et al. |
| 2020/0383220 A1 | 12/2020 | Kang et al. |

(Continued)

FOREIGN PATENT DOCUMENTS

| CN | 208656822 U | 3/2019 |
| CN | 208686793 U | 4/2019 |

(Continued)

OTHER PUBLICATIONS

Machine translation of WO 2020/186889 (Year: 2020).*

*Primary Examiner* — Matthew D. Anderson
(74) *Attorney, Agent, or Firm* — WOMBLE BOND DICKINSON (US) LLP

(57) ABSTRACT

This application provides a folding assembly and a foldable electronic device. The folding assembly is applied to a foldable electronic device, and is configured to carry a flexible display screen. The folding assembly includes a shaft base, a first housing, and a second housing. The first housing and the second housing are respectively disposed on both sides of the shaft base. A door plate swing arm is located above the shaft base and is disposed on each of both sides of a center line of the shaft base, one end of each door plate swing arm is rotatably connected to the shaft base, and the other end of each door plate swing arm is rotatably connected to the first housing or the second housing.

20 Claims, 12 Drawing Sheets

(56) References Cited

U.S. PATENT DOCUMENTS

| | | |
|---|---|---|
| 2022/0116489 A1 | 4/2022 | Nagai et al. |
| 2022/0217228 A1 | 7/2022 | Hu et al. |
| 2023/0075646 A1 | 3/2023 | Niu et al. |

FOREIGN PATENT DOCUMENTS

| | | |
|---|---|---|
| CN | 209358590 U | 9/2019 |
| CN | 209375705 U | 9/2019 |
| CN | 110784570 A | 2/2020 |
| CN | 111147637 A | 5/2020 |
| CN | 210836896 U | 6/2020 |
| CN | 111614806 A | 9/2020 |
| CN | 111698355 A | 9/2020 |
| CN | 111885235 A | 11/2020 |
| CN | 211981915 U | 11/2020 |
| CN | 112153178 A | 12/2020 |
| CN | 112153188 A | 12/2020 |
| CN | 112901642 A | 6/2021 |
| KR | 20200097385 A | 8/2020 |
| WO | 2019134693 A1 | 7/2019 |
| WO | 2020186889 A1 | 9/2020 |

\* cited by examiner

FOLDING ASSEMBLY AND FOLDABLE ELECTRONIC DEVICE

CROSS-REFERENCE TO RELATED APPLICATIONS

This application is a national stage of International Application No. PCT/CN2022/071460, filed on Jan. 11, 2022, which claims priority to Chinese Patent Application No. 202110050482.1, filed on Jan. 14, 2021, and Chinese Patent Application No. 202110230558.9, filed on Mar. 2, 2021. The disclosures of all the aforementioned applications are hereby incorporated by reference in their entireties.

TECHNICAL FIELD

This application relates to a folding assembly and a foldable electronic device that includes the folding assembly.

BACKGROUND

In a foldable electronic device, a foldability function of the electronic device is generally implemented by using a folding assembly. A structure design of the folding assembly and layout between structures directly affect a size of the foldable electronic device after being folded and mechanical stability and reliability of the folding assembly.

In a current structure design solution of the folding assembly, in a folding movement process of the folding assembly, there are a large quantity of movement cooperation mechanisms, causing poor stability of the folding assembly. In addition, space occupied by the entire folding assembly is also large, causing a large size of the folding assembly in a folded state.

SUMMARY

Embodiments of this application provide a folding assembly and a foldable electronic device, to resolve a problem that a size of the folding assembly in a folded state is large and stability of the folding assembly is poor.

To achieve the foregoing objective, the following technical solutions are used in this application:

According to a first aspect, a folding assembly is provided. The folding assembly is applied to a foldable electronic device, and is configured to carry a flexible display screen. The folding assembly includes a shaft base, a first housing, and a second housing. The first housing and the second housing are respectively disposed on both sides of the shaft base. A door plate swing arm is located above the shaft base and is disposed on each of both sides of a center line of the shaft base, one end of each door plate swing arm is rotatably connected to the shaft base, and the other end of each door plate swing arm is rotatably connected to the first housing or the second housing.

Based on the folding assembly, the door plate structure and the swing arm structure of the folding assembly are combined to form the door plate swing arm. In this way, in a process in which the flexible display screen is folded, the two door plate swing arms on both sides of the shaft base only need to cooperate with the shaft base and the first housing or the second housing on two sides of the shaft base for movement, so that a movement cooperation mechanism is simple, thereby greatly improving stability and reliability of the folding assembly. In addition, after the door plate structure and the swing arm structure are combined, space utilization of the folding assembly can be improved, thereby reducing a size of the folding assembly after being folded, and improving user experience.

Optionally, a first sliding groove is located on the shaft base and is disposed on each of both sides of the center line of the shaft base, first sliding rails adapted to the first sliding grooves on both sides of the center line of the shaft base are respectively disposed on the door plate swing arms on both sides of the shaft base, and when the door plate swing arm rotates based on the shaft base, the first sliding rail slides along the first sliding groove. In this way, when the two door plate swing arms rotate to enable an included angle between the two door plate swing arms to be 180 degrees, an upper surface of the shaft base may be attached to a lower surface of the door plate swing arm, to form a stable blocking effect to keep the included angle between the two door plate swing arms at 180 degrees.

Further, the first sliding groove is an arc-shaped groove, a first arc-shaped boss is disposed on each of both side walls of the first sliding groove, a first arc-shaped recess adapted to the first arc-shaped boss is disposed on each of both sides of the first sliding rail, and when the first sliding rail slides along the first sliding groove, the first arc-shaped boss slides along the first arc-shaped recess. In this way, when the door plate swing arm rotates based on the shaft base, the first arc-shaped boss and the first arc-shaped recess may limit stable sliding of the first sliding rail in the first sliding groove, to prevent the first sliding rail on the door plate swing arm from sliding out of the first sliding groove in a sliding process, thereby improving structural stability and reliability of the folding assembly.

In a possible implementation, both the first housing and the second housing are wedge-shaped structures, and when the folding assembly changes from an unfolded state to a folded state, a wedge-shaped surface of the first housing approaches the door plate swing arm connected to the first housing until the wedge-shaped surface is attached to the door plate swing arm, and a wedge-shaped surface of the second housing approaches the door plate swing arm connected to the second housing until the wedge-shaped surface is attached to the door plate swing arm. In this way, when the folding assembly is in a fully folded state, a water drop shape or another required shape may be formed between the two door plate swing arms, that is, a water drop screen can be formed after the folded flexible display screen is folded, thereby improving a folding life. In addition, when the folding assembly is in a fully unfolded state, the first housing and the second housing can effectively support the door plate swing arm, thereby improving structural stability of the folding assembly.

Optionally, a second sliding groove is disposed on each of the first housing and the second housing, a second sliding rail adapted to the second sliding groove is disposed on each door plate swing arm, and when the door plate swing arm rotates based on the shaft base, the second sliding rail slides along the second sliding groove. In this way, an included angle between the door plate swing arm and the first housing or the second housing may change.

Further, the second sliding groove is an arc-shaped groove, a second arc-shaped boss is disposed on each of both sides of the second sliding groove, a second arc-shaped recess adapted to the second arc-shaped boss is disposed on each of both sides of the second sliding rail, and when the second sliding rail slides along the second sliding groove, the second arc-shaped boss slides along the first arc-shaped recess. In this way, when the door plate swing arm moves relative to the first housing or the second housing, the second arc-shaped boss and the second arc-shaped recess may limit stable sliding of the second sliding rail in the second sliding groove, to prevent the second sliding rail on the door plate swing arm from sliding out of the second sliding groove in a sliding process, thereby improving structural stability and reliability of the folding assembly.

In a possible implementation, the folding assembly further includes a synchronization mechanism, the synchronization mechanism is located between the first housing and the second housing, and a first swing arm and a second swing arm are respectively connected to both sides of the synchronization mechanism; a third sliding groove is disposed on each of the first housing and the second housing, the first swing arm is adapted to the third sliding groove on the first housing, and the second swing arm is adapted to the third sliding groove on the second housing; and when the door plate swing arm rotates based on the shaft base, the first swing arm slides along the third sliding groove on the first housing, and the second swing arm slides along the third sliding groove on the second housing. In this way, under the action of the synchronization mechanism, when the first housing is folded inward, the second housing may be synchronously folded inward; on the contrary, when the second housing is folded inward, the first housing may also be synchronously folded inward.

Optionally, the synchronization mechanism includes a first gear shaft and a second gear shaft that are symmetrically disposed, the first swing arm is fixedly connected to the first gear shaft, and the second swing arm is fixedly connected to the second gear shaft; and a first gear is disposed on the first gear shaft, a second gear is disposed on the second gear shaft, and the first gear and the second gear mesh with each other by using a synchronization gear combination. For example, when the first housing is folded inward, the first housing may drive the first swing arm to rotate. In this case, the first swing arm performs rotation movement by using the first gear as a fulcrum and a center of a circle. During rotation, the synchronization gear combination may be driven to move, the synchronization gear combination drives the second gear to move, and the second gear drives the second gear shaft to rotate, to drive the second swing arm to perform rotation movement, so that the first housing and the second housing are synchronously folded inward.

Further, the synchronization gear combination includes a first synchronization gear and a second synchronization gear that mesh with each other, the first synchronization gear meshes with the first gear, and the second synchronization gear meshes with the second gear. In this way, the first gear may drive the first synchronization gear to move, the first synchronization gear drives the second synchronization gear to move, and then the second synchronization gear drives the second gear to move, so that the first housing and the second housing are synchronously folded inward.

Optionally, the first swing arm and the second swing arm are fixedly connected to the first gear shaft and the second gear shaft respectively by using two spaced connecting rings each. The first gear shaft between the two spaced connecting rings and the second gear shaft between the two spaced connecting rings are each sleeved with a damping spring and a damping cam. In this way, the damping spring generates friction force by squeezing the damping cam, to form a movement damping effect, thereby improving structural stability and reliability of the folding assembly in a rotation and folding process.

According to a second aspect, a foldable electronic device is provided. The foldable electronic device includes a flexible display screen and the folding assembly according to any one of the possible implementations of the first aspect. The flexible display screen is attached to an upper surface of the folding assembly.

It may be understood that any foldable electronic device provided above may be implemented by the corresponding folding assembly provided above, or may be associated with the corresponding folding assembly provided above. Therefore, for beneficial effects that can be achieved by the foldable electronic device, refer to the beneficial effects of the folding assembly provided above, and details are not described herein again.

DESCRIPTION OF EMBODIMENTS

To make the objectives, technical solutions, and advantages of this application clearer, the following further describes this application in detail with reference to the accompanying drawings.

The terms "first" and "second" below are merely intended for a purpose of description, and shall not be understood as an indication or implication of relative importance or implicit indication of the quantity of indicated technical features. Therefore, a feature limited by "first" or "second" can explicitly or implicitly includes one or more features. In the descriptions of this application, unless otherwise specified, "a plurality of" means two or more.

In addition, in this application, the orientation terms such as "top" and "bottom" are defined relative to the orientations in which the components in the accompanying drawings are schematically placed. It should be understood that these orientation terms are relative concepts, are used for relative description and clarification, and may be correspondingly changed based on changes in the orientations in which the components are placed in the accompanying drawings.

A foldable electronic device is an electronic device, where a flexible display screen of the electronic device can be folded, and a foldability function of the electronic device may be implemented by using a folding assembly built in the electronic device. The foldable electronic device may be a product with a display interface, for example, a mobile phone, a display, a tablet computer, or an in-vehicle computer. A specific form of the foldable electronic device is not specially limited in the embodiments of this application.

Figure 1:
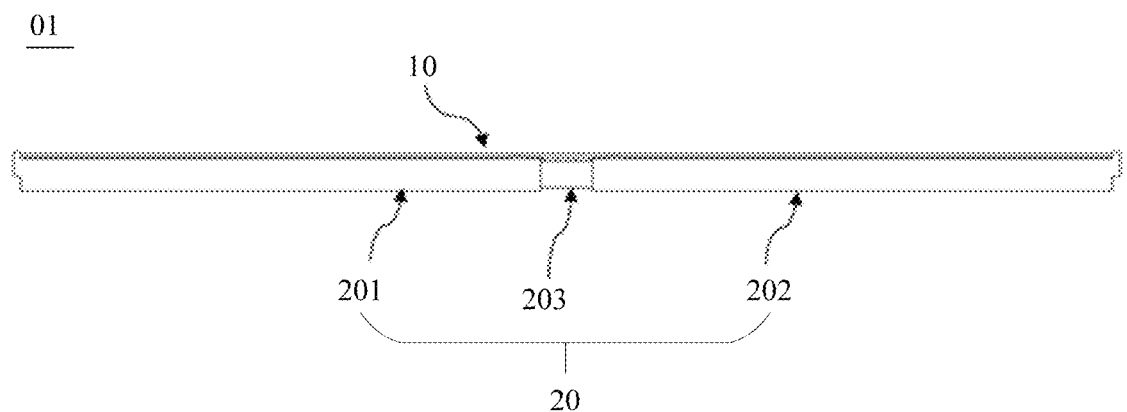
FIG. 1 is a schematic diagram of a structure of a foldable electronic device in an unfolded state.

As shown in FIG. 1, the mobile phone is used as an example. A foldable electronic device 01 includes a flexible display screen 10. For example, the flexible display screen 10 may be an active matrix organic light emitting diode (active matrix organic light emitting diode, AMOLED) display screen.

As a self-luminous display screen, the AMOLED display screen does not need to be provided with a backlight module (backlight module, BLM). Therefore, when a substrate in the AMOLED display screen is made of a flexible resin material such as polyethylene terephthalate (polyethylene terephthalate, PET), the foregoing AMOLED display screen can be characterized by bendability.

It should be understood that the electronic device shown in FIG. 1 is a foldable electronic device designed to be folded inward. In a folded state, the flexible display screen is located on an inner side of the device.

To implement a foldability function of the electronic device, as shown in FIG. 1, the foldable electronic device 01 further includes a folding assembly 20 configured to carry the flexible display screen 10, and the flexible display screen 10 is attached to an upper surface of the folding assembly.

The folding assembly 20 includes a first housing assembly 201, a second housing assembly 202, and a rotating shaft assembly 203 located between the first housing assembly 201 and the second housing assembly 202.

Figure 2:
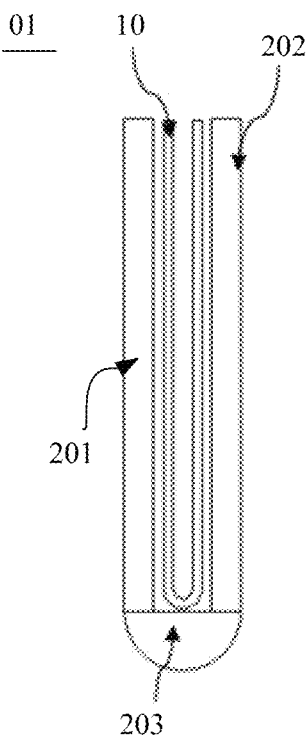
FIG. 2 is a schematic diagram of a structure of a foldable electronic device in a folded state.

The first housing assembly 201 and the second housing assembly 202 may be middle frame structures of the electronic device. The first housing assembly 201 and the second housing assembly 202 may rotate along both sides of the rotating shaft assembly 203, to drive the flexible display screen 10 to fold or unfold. As shown in FIG. 1, when an included angle between the first housing assembly 201 and the second housing assembly 202 is 180 degrees, the flexible display screen 10 is in an unfolded state. Alternatively, as shown in FIG. 2, when the first housing assembly 201 and the second housing assembly 202 are joined together, the flexible display screen 10 is in a folded state.

Figure 3:
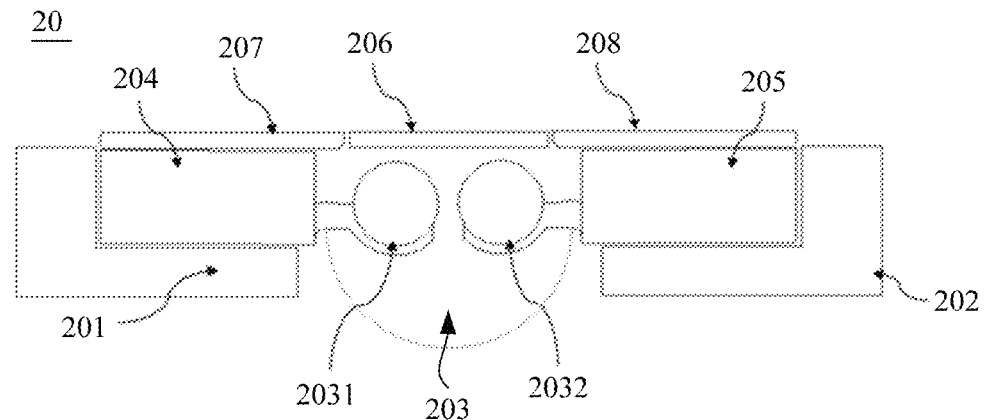
FIG. 3 is a schematic diagram of a structure of a folding assembly in an unfolded state.
Figure 4:
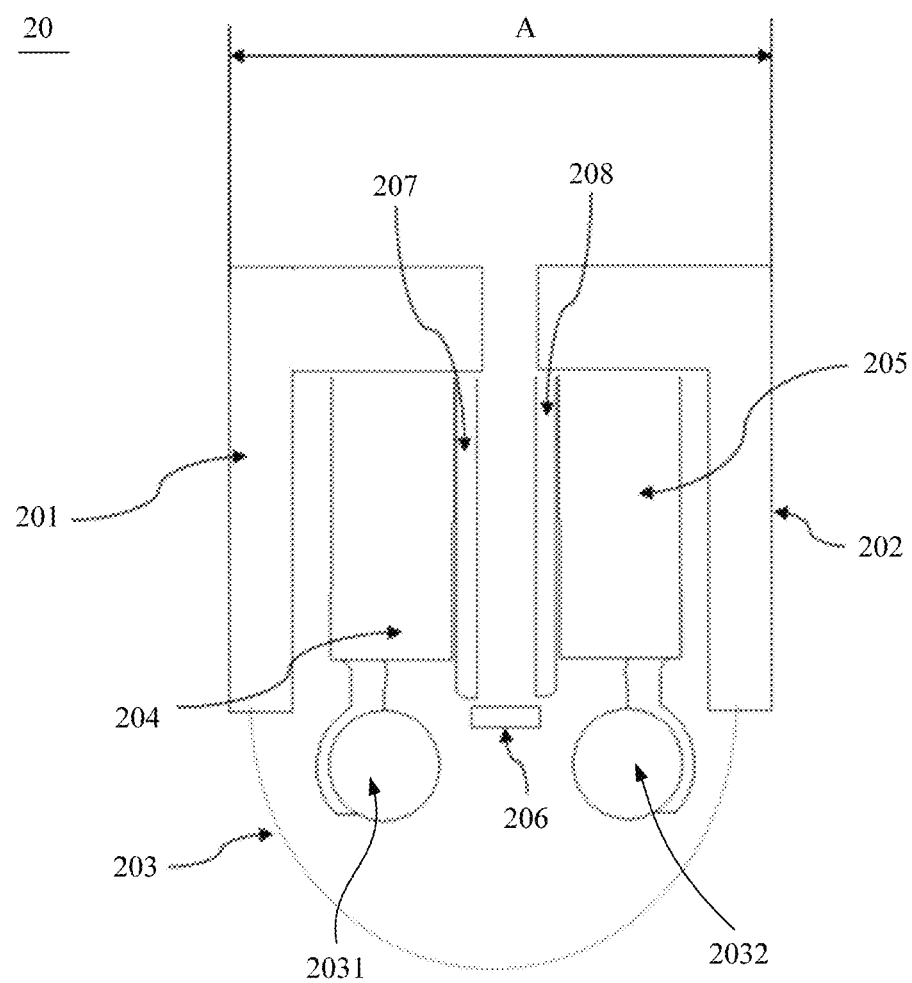
FIG. 4 is a schematic diagram of a structure of a folding assembly in a folded state.

FIG. 3 and FIG. 4 are schematic diagrams of a folding assembly in an unfolded or folded state. The folding assembly 20 includes a rotating shaft assembly 203, and L-shaped middle frame structures disposed on both sides of the rotating shaft assembly 203. The middle frame structures on both sides of the rotating shaft assembly 203 are respectively used as a first housing assembly 201 and a second housing assembly 202. A first swing arm structure 204 and a second swing arm structure 205 are respectively disposed above L-shaped areas of the first housing assembly 201 and the second housing assembly 202. The first swing arm structure 204 and the first housing assembly 201 are locked by using a screw, and the second swing arm structure 205 and the second housing assembly 202 are locked by using a screw. Two rotating shafts are symmetrically disposed on the rotating shaft assembly 203, and are respectively a first rotating shaft 2031 and a second rotating shaft 2032. The first swing arm structure 204 is rotatably connected to the first rotating shaft 2031, and rotates by using the first rotating shaft 2031 as a center. The second swing arm structure 205 is rotatably connected to the second rotating shaft 2032, and rotates by using the second rotating shaft 2032 as a center.

In addition, an inner door plate 206 is further disposed on the rotating shaft assembly 203, a first outer door plate 207 and a second outer door plate 208 are respectively disposed on both sides of the inner door plate 206, the first outer door plate 207 and the second outer door plate 208 may respectively slide along upper surfaces of the first swing arm structure 204 and the second swing arm structure 205, and a door plate structure jointly formed by the inner door plate 206, the first outer door plate 207, and the second outer door plate 208 is configured to carry the flexible display screen in the foldable electronic device.

As shown in FIG. 3 and FIG. 4, when the first swing arm structure 204 rotates by using the first rotating shaft 2031 as a center, the first outer door plate 207 may be driven to rotate with the first swing arm structure 204, and the first outer door plate 207 may be driven to slide along the upper surface of the first swing arm structure 204, so that the foldable electronic device that uses the folding assembly 20 is in an unfolded or folded state.

It should be noted that, in the folding assembly 20 shown in FIG. 3 and FIG. 4, the door plate structure and the swing arm structure are independent structures. In addition, in a process in which the folding assembly 20 is unfolded or folded, the door plate structure and the swing arm structure need to cooperate with each other. In a movement process, there are a large quantity of movement cooperation mechanisms, and a dimension chain is long. As a result, stability and reliability of the folding assembly 20 are poor. In addition, due to the structure in which the door plate structure and the swing arm are separated, the entire folding assembly 20 occupies large space, and an overall thickness of the foldable electronic device is large. As a result, user experience is poor. As shown in FIG. 4, when the folding assembly 20 is in a folded state, a size A of the folding assembly after being folded is large, for example, is greater than 14.8 millimeters (mm).

Figure 5:
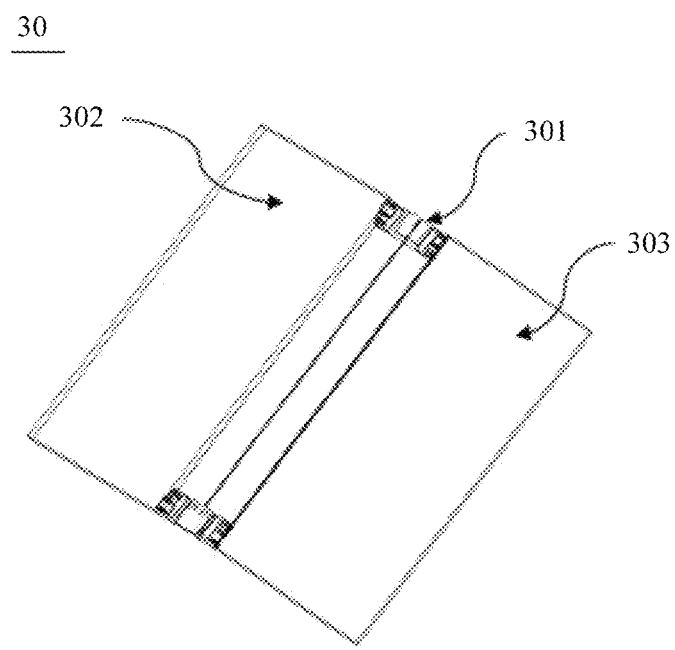
FIG. 5 is a schematic diagram of an overall structure of a folding assembly according to an embodiment of this application.
Figure 6:
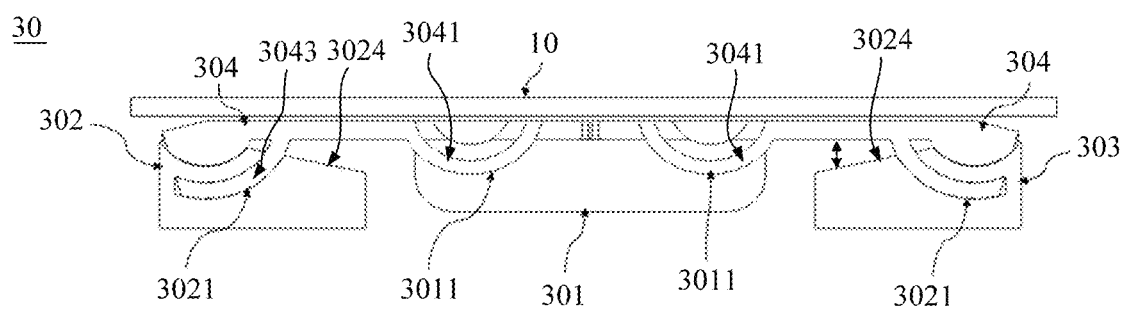
FIG. 6 is a schematic diagram of a structure of a folding assembly in an unfolded state according to an embodiment of this application.

To reduce a size of the folding assembly in a folded state, and improve stability of the folding assembly, the embodiments of this application provide an improved folding assembly, for example, a folding assembly 30 shown in FIG. 5 and FIG. 6.

As shown in FIG. 5 and FIG. 6, the folding assembly 30 is applied to the foldable electronic device 01 shown in FIG. 1 and FIG. 2, and is configured to carry the flexible display screen 10. The folding assembly 30 includes a shaft base 301, a first housing 302, and a second housing 303. The first housing 302 and the second housing 303 are respectively disposed on both sides of the shaft base 301. A door plate swing arm 304 is located above the shaft base 301 and is disposed on each of both sides of a center line of the shaft base 301, one end of each door plate swing arm 304 is rotatably connected to the shaft base 301, and the other end of each door plate swing arm 304 is rotatably connected to the first housing 302 or the second housing 303.

It should be understood that the first housing 302 and the second housing 303 may be middle frame structures of the foldable electronic device 01. The door plate swing arms 304 disposed on both sides of the center line of the shaft base 301 may be symmetrically disposed along the center line of the shaft base 301, or may be asymmetrically disposed, for example, may be staggered along the center line of the shaft base 301.

For example, when an included angle between the door plate swing arms 304 on both sides of the shaft base 301 is less than 180 degrees because the door plate swing arms 304 on both sides of the shaft base 301 rotate by using the shaft base 301 as a fulcrum, the flexible display screen 10 is folded. In a process in which the flexible display screen 10 is folded, when the folding assembly 30 is folded, the door plate swing arm 304 rotates by using the shaft base 301 as a fulcrum. In a rotation process, the door plate swing arms 304 on both sides of the shaft base 301 further move relative to the first housing 302 or the second housing 303 on two sides of the shaft base 301, so that the folding assembly 30 drives the flexible display screen 10 above the folding assembly 30 to be in an unfolded or folded state.

Therefore, in this embodiment of this application, the door plate structure and the swing arm structure are combined to form the door plate swing arm 304. In this way, in a process in which the flexible display screen 10 is folded, the two door plate swing arms 304 above the shaft base 301 only need to cooperate with the shaft base 301 and the first housing 302 or the second housing 303 on two sides of the shaft base 301 for movement, so that a movement cooperation mechanism is simple, thereby greatly improving stability and reliability of the folding assembly 30. In addition, after the door plate structure and the swing arm structure are combined, space utilization of the folding assembly 30 can be improved, thereby reducing a size of the folding assembly 30 after being folded, and improving user experience.

Figure 7:
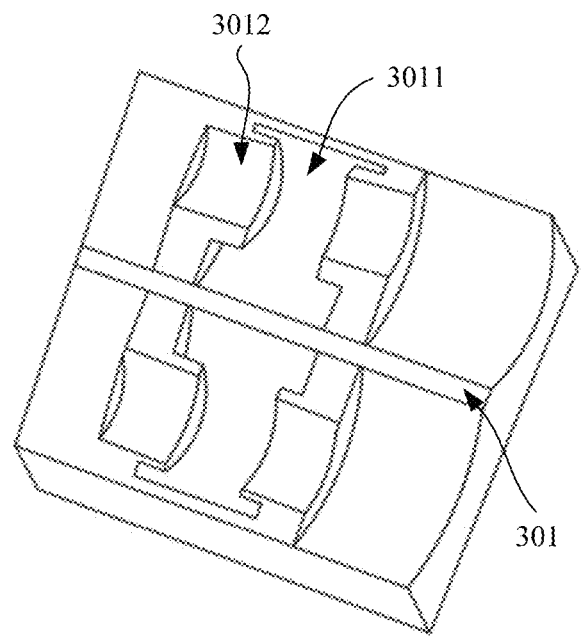
FIG. 7 is a schematic diagram of a structure of the shaft base shown in FIG. 6.
Figure 8:
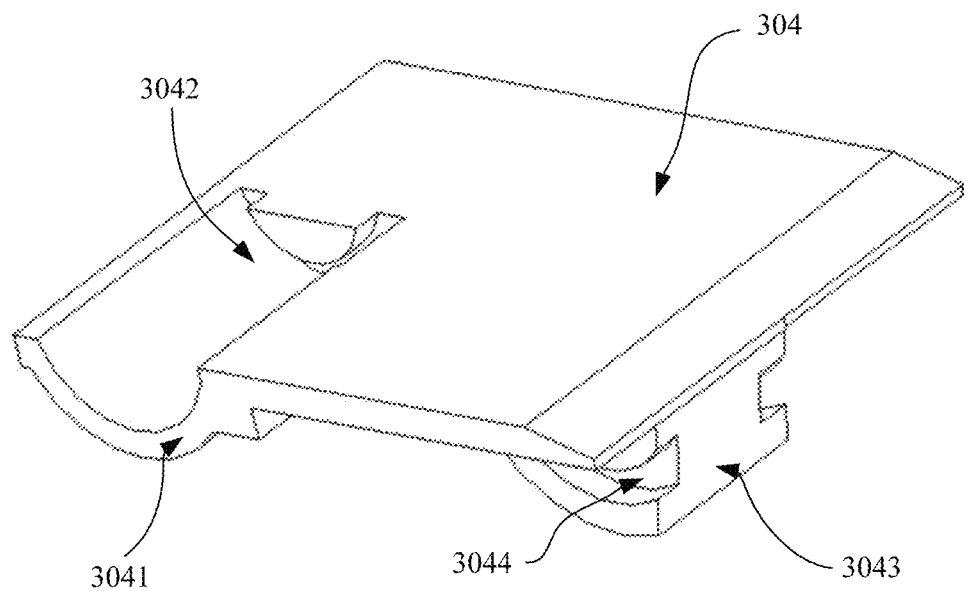
FIG. 8 is a schematic diagram of a structure of the door plate swing arm shown in FIG. 6.
Figure 9:
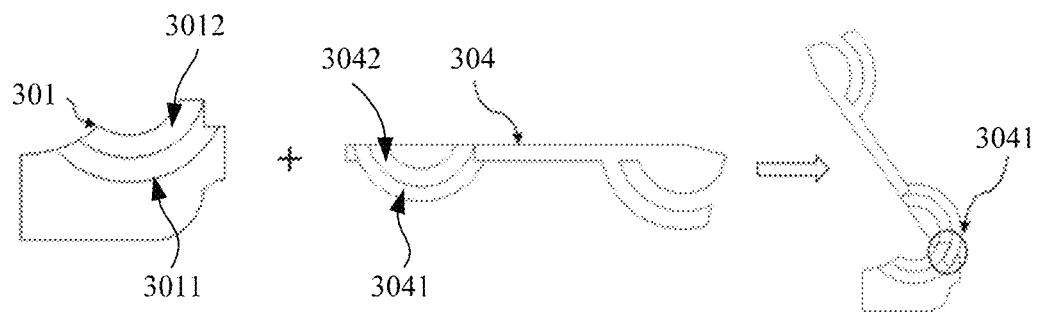
FIG. 9 is a schematic diagram of a structure for connecting the shaft base shown in FIG. 7 and the door plate swing arm shown in FIG. 8.
Figure 10:
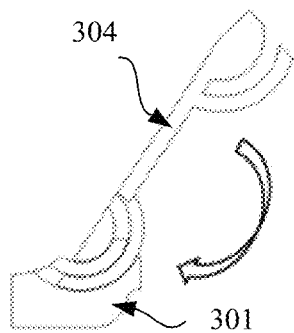
FIG. 10 is a schematic diagram of the connection structure shown in FIG. 9 in a rotation and assembly process.
Figure 11:
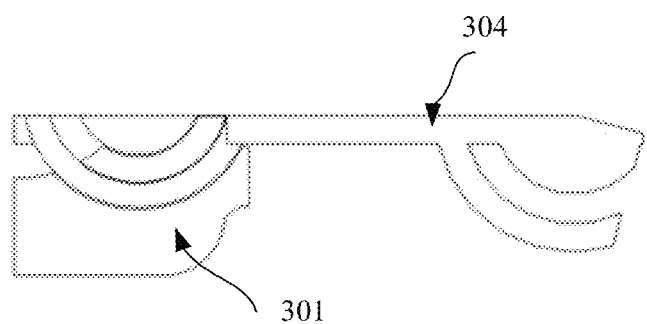
FIG. 11 is a schematic diagram of the connection structure shown in FIG. 9 when the connection structure rotates and is assembled in place.

Optionally, as shown in FIG. 7, FIG. 8, and FIG. 9, a first sliding groove 3011 is located on the shaft base 301 and is disposed on each of both sides (namely, a position at which the shaft base 301 is rotatably connected to the door plate swing arm 304) of the center line of the shaft base. First sliding rails 3041 adapted to the first sliding grooves 3011 on both sides of the center line of the shaft base are respectively disposed on the door plate swing arms 304 on both sides of the shaft base (to reflect a structural feature of the door plate swing arm 304, FIG. 8 is a schematic diagram of a structure obtained after the door plate swing arm 304 is cut from the middle, and therefore only one part of the first sliding rail 3041 is shown in FIG. 8, and the other part may be a structure that is symmetrical to the part shown in FIG. 8). When the door plate swing arm 304 rotates based on the shaft base 301 (rotates by using the shaft base 301 as a fulcrum), the first sliding rail 3041 slides along the first sliding groove 3011. To enable the included angle between the two door plate swing arms 304 connected to the shaft base 301 to change between 0 degrees and 108 degrees, the first sliding groove 3011 may be an arc-shaped groove disposed on an upper surface of the shaft base 301, and the first sliding rail 3041 may be an arc-shaped protrusion that is disposed on a lower surface of the door plate swing arm 304 and that is adapted to the arc-shaped groove. Alternatively, the first sliding groove 3011 may be an arc-shaped groove built into the shaft base 301 from an upper surface of the shaft base 301, and the first sliding rail 3041 may be an arc-shaped arm that is disposed on a lower surface of the door plate swing arm 304 and that matches the arc-shaped groove built into the shaft base 301. Therefore, as shown in FIG. 10 and FIG. 11, when the two door plate swing arms 204 rotate on the shaft base 301, the first sliding rail 3041 gradually penetrates into the first sliding groove 3011. When the two door plate swing arms 304 rotate to enable the included angle between the two door plate swing arms 304 to be 180 degrees, the upper surface of the shaft base 301 may be attached to the lower surface of the door plate swing arm 304, to form a stable blocking effect to keep the included angle between the two door plate swing arms 304 at 180 degrees.

In addition, to ensure structural stability, the first sliding rail 3041 and the door plate swing arm 304 may be integrally formed. If the first sliding groove 3011 is an arc-shaped groove disposed on the upper surface of the shaft base 301, a first arc-shaped boss 3012 is disposed on each of both side walls of the first sliding groove 3011, and a first arc-shaped recess 3042 adapted to the first arc-shaped boss 3012 is disposed on each of both side walls of the first sliding rail 3041. Likewise, when the first sliding rail 3041 slides along the first sliding groove 3011, the first arc-shaped boss 3012 may slide along the first arc-shaped recess 3042. In this way, when the door plate swing arm 304 rotates based on the shaft base 301, the first arc-shaped boss 3012 and the first arc-shaped recess 3042 may limit stable sliding of the first sliding rail 3041 in the first sliding groove 3011, to prevent the first sliding rail 3041 on the door plate swing arm 304 from sliding out of the first sliding groove 3011 in a sliding process, thereby improving structural stability and reliability of the folding assembly 30.

It should be noted that FIG. 7, FIG. 8, and FIG. 9 only show a manner in which the door plate swing arm 304 is rotatably connected to the shaft base 301. The door plate swing arm 304 may be rotatably connected to the shaft base 301 in another manner, for example, the door plate swing arm 304 is rotatably connected to the shaft base 301 by using a rotating shaft. These fall within the protection scope of this application.

Figure 17:
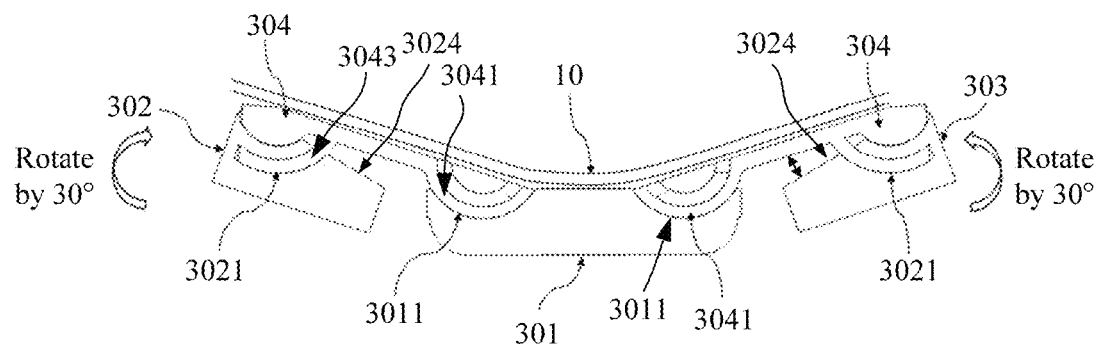
FIG. 17 is a schematic diagram of a structure of the folding assembly shown in FIG. 6 when the folding assembly is folded inward by 30°.
Figure 18:
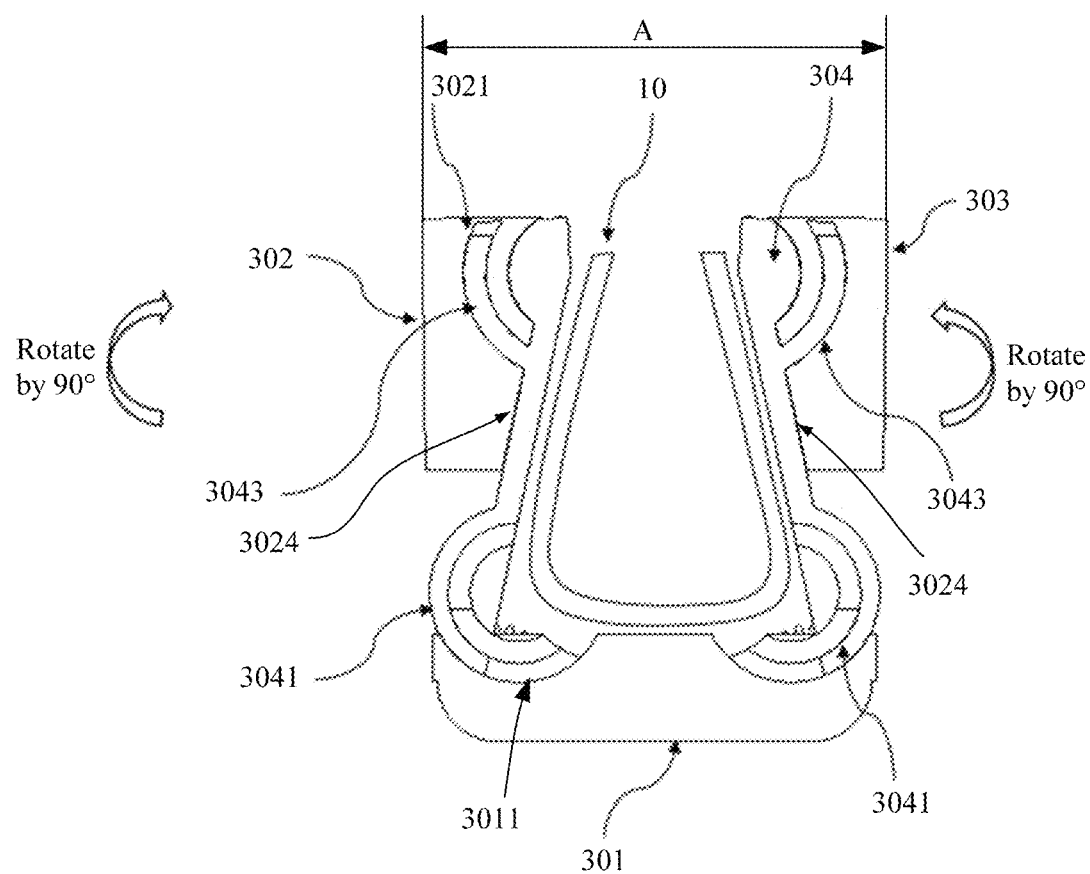
FIG. 18 is a schematic diagram of a structure of the folding assembly shown in FIG. 6 in a fully folded state.
Figure 19:
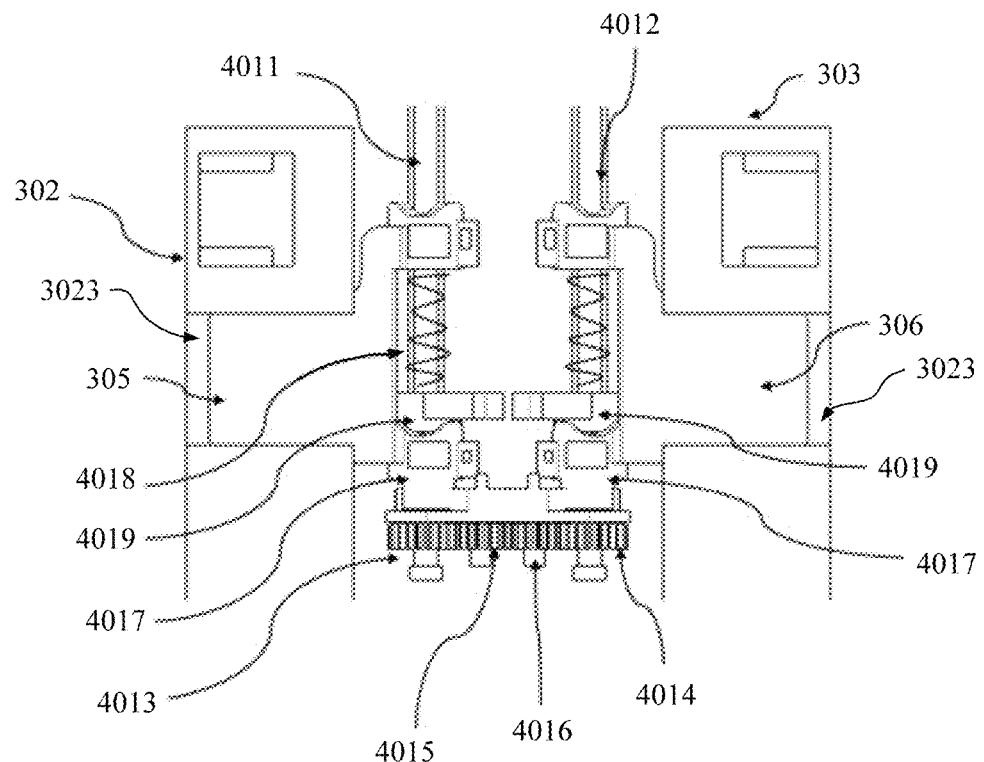
FIG. 19 is a schematic diagram of a top-view structure of a structure for connecting a folding assembly and a synchronization mechanism according to an embodiment of this application.
Figure 20:
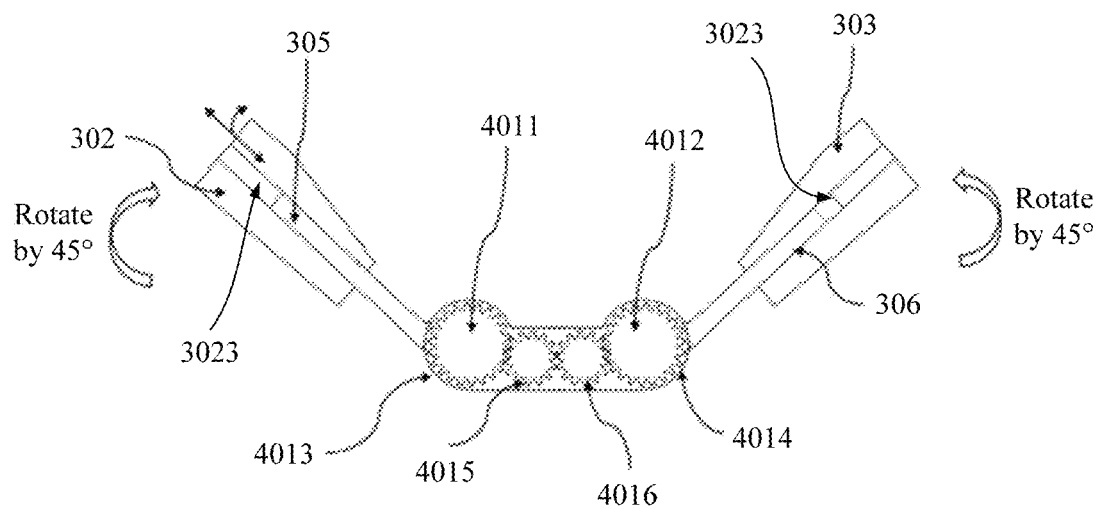
FIG. 20 is a schematic diagram of a side-view structure of a structure for connecting a folding assembly and a synchronization mechanism according to an embodiment of this application.

To save space, the first housing 302 and the second housing 303 may be disposed as wedge-shaped structures shown in FIG. 6. With reference to FIG. 17 and FIG. 18, when the folding assembly 30 changes from an unfolded state to a folded state, a wedge-shaped surface 3024 of the first housing 302 approaches a corresponding door plate swing arm 304 (namely, the door plate swing arm 304 connected to the first housing 302) until the wedge-shaped surface 3024 is attached to the door plate swing arm 304, and a wedge-shaped surface 3024 of the second housing 303 approaches a corresponding door plate swing arm 304 (namely, the door plate swing arm 304 connected to the second housing 303) until the wedge-shaped surface 3024 is attached to the door plate swing arm 304. During relative movement formed because the door plate swing arm 304 is rotatably connected to the first housing 302 or the second housing 303, the foregoing action that the wedge-shaped surface approaches the door plate swing arm until the wedge-shaped surface is attached to the door plate swing arm may be completed. In this way, when the folding assembly 30 shown in FIG. 6 is in a fully folded state, a water drop shape or another required shape (shown in FIG. 18) may be formed between the two door plate swing arms 304, that is, a water drop screen can be formed after the folded flexible display screen 10 is folded, thereby improving a folding life. In addition, when the folding assembly 30 is in a fully unfolded state, the first housing 302 and the second housing 303 can effectively support the door plate swing arm 304, thereby improving structural stability of the folding assembly 30.

Optionally, as shown in FIG. 6, FIG. 12, FIG. 13, and FIG. 14, to complete a process in which the wedge-shaped surface 3024 of the first housing 302 or the second housing 303 approaches the corresponding door plate swing arm 304 until the wedge-shaped surface 3024 is attached to the door plate swing arm 304, a second sliding groove 3021 is disposed on each of the first housing 302 and the second housing 303, a second sliding rail 3043 adapted to the second sliding groove 3021 is disposed on each door plate swing arm 304, and when the door plate swing arm 304 rotates based on the shaft base 301 (rotates by using the shaft base 301 as a fulcrum), the second sliding rail 3043 slides along the second sliding groove 3021.

To enable an included angle between the door plate swing arm 304 and the first housing 302 or the second housing 303 to change, the second sliding groove 3021 may be an arc-shaped groove disposed on an upper surface of the first housing 302 or the second housing 303, and the second sliding rail 3043 may be an arc-shaped protrusion that is disposed on the lower surface of the door plate swing arm 304 and that is adapted to the arc-shaped groove. Alternatively, the second sliding groove 3021 may be an arc-shaped groove that is built into the shaft base 301 from an upper surface of the first housing 302 or the second housing 303, and the second sliding rail 3043 may be an arc-shaped arm that is disposed on the lower surface of the door plate swing arm 304 and that matches the arc-shaped groove built into the first housing 302 or the second housing 303.

In addition, to ensure structural stability, the second sliding rail 3043 and the door plate swing arm 304 may be integrally formed. If the second sliding groove 3021 is an arc-shaped groove disposed on the upper surface of the first housing 302 or the second housing 303, a second arc-shaped boss 3022 is disposed on each of both side walls of the second sliding groove 3021, and a second arc-shaped recess 3044 adapted to the second arc-shaped boss 3022 is disposed on each of both side walls of the second sliding rail 3043. Likewise, when the second sliding rail 3043 slides along the second sliding groove 3021, the second arc-shaped boss 3022 may slide along the second arc-shaped recess 3044. In this way, when the door plate swing arm 304 moves relative to the first housing 302 or the second housing 303, the second arc-shaped boss 3022 and the second arc-shaped recess 3044 may limit stable sliding of the second sliding rail 3043 in the second sliding groove 3021, to prevent the second sliding rail 3043 on the door plate swing arm 304 from sliding out of the second sliding groove 3021 in a sliding process, thereby improving structural stability and reliability of the folding assembly 30.

Figure 12:
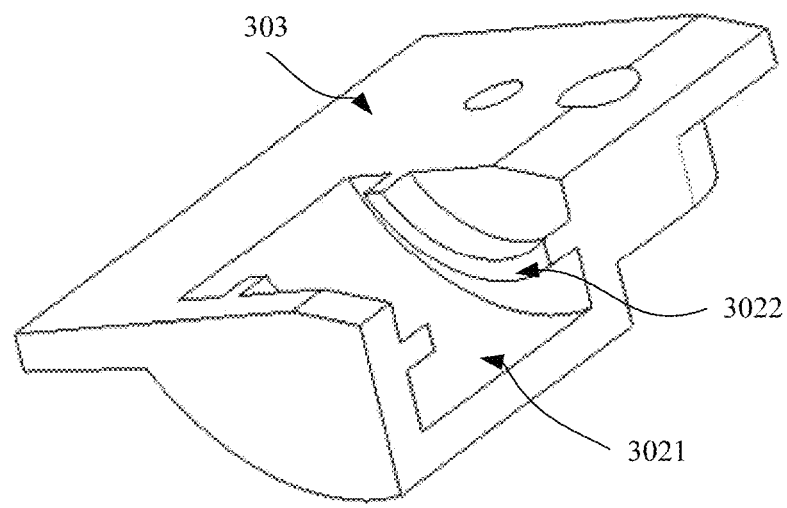
FIG. 12 is a schematic diagram of a structure of the second housing shown in FIG. 6.
Figure 13:
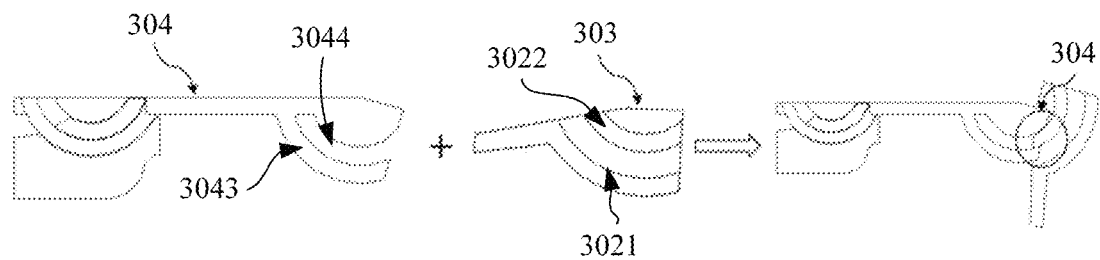
FIG. 13 is a schematic diagram 1 of a structure for connecting the second housing shown in FIG. 12 and the door plate swing arm shown in FIG. 8.
Figure 14:
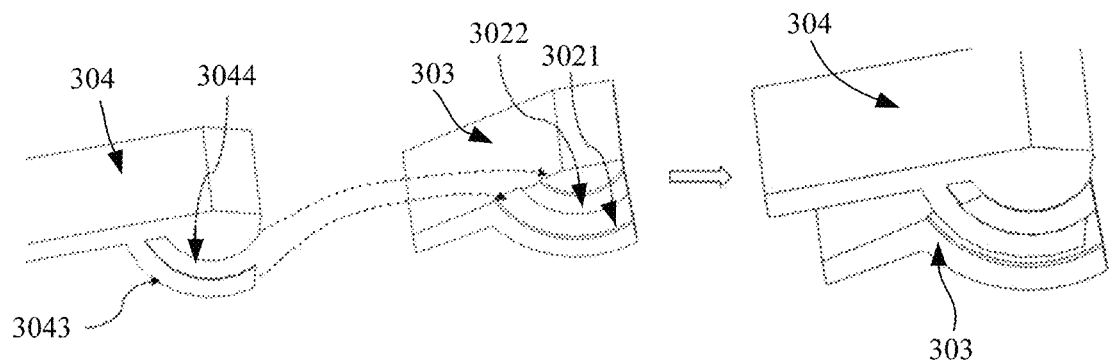
FIG. 14 is a schematic diagram 2 of a structure for connecting the second housing shown in FIG. 12 and the door plate swing arm shown in FIG. 8.

It should be noted that, FIG. 12, FIG. 13, and FIG. 14 only show a manner in which the door plate swing arm 304 is rotatably connected to the first housing 302 or the second housing 303. The door plate swing arm 304 may be rotatably connected to the first housing 302 or the second housing 303 in another manner, for example, the door plate swing arm 304 is rotatably connected to the first housing 302 or the second housing 303 by using a rotating shaft. These fall within the protection scope of this application.

Figure 15:
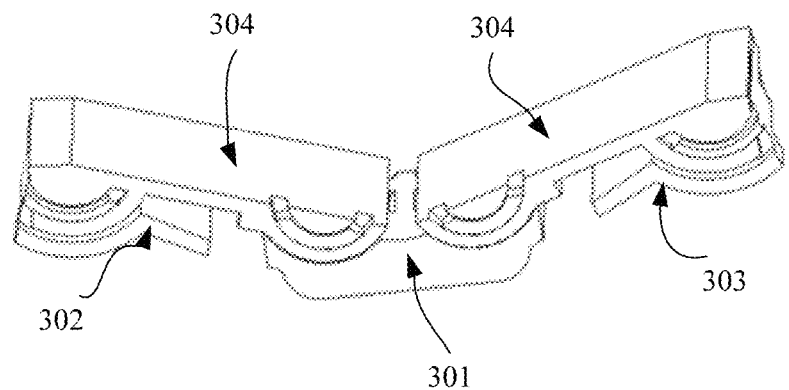
FIG. 15 is a schematic diagram of a three-dimensional structure of the folding assembly shown in FIG. 6.
Figure 16:
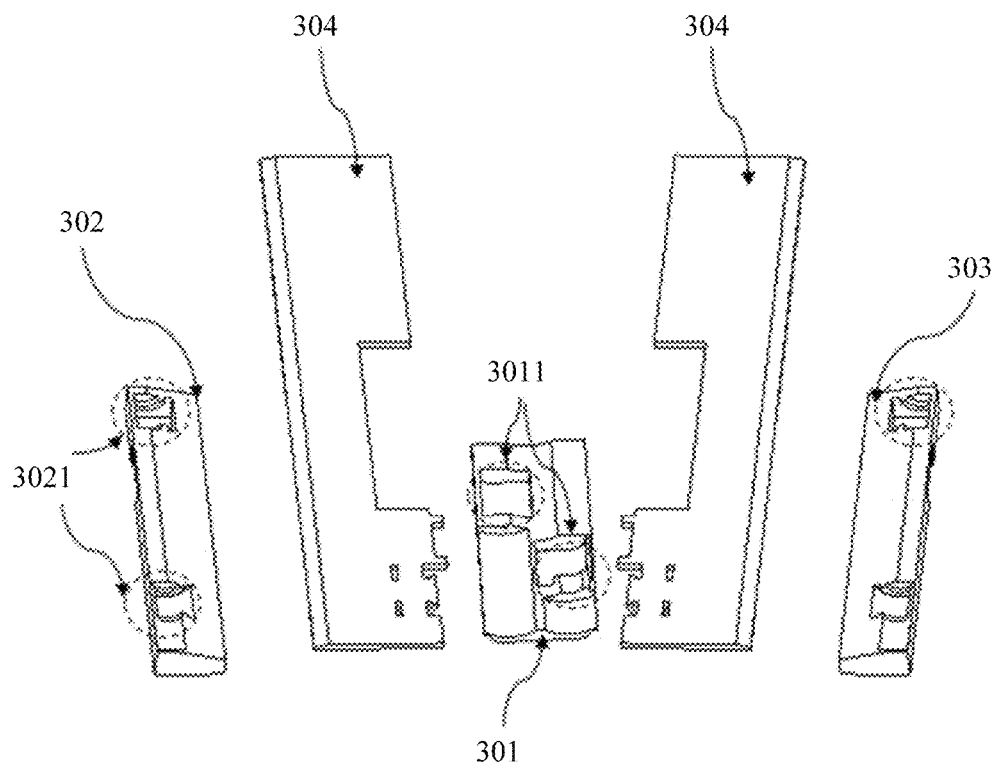
FIG. 16 is a schematic diagram of an exploded structure of the folding assembly shown in FIG. 6.

With reference to the accompanying drawings in FIG. 7 to FIG. 14, a schematic diagram of a three-dimensional structure of a folding assembly shown in FIG. 15 and a schematic diagram of an exploded structure of a folding assembly shown in FIG. 16 may be finally formed. For ease of display, in the schematic diagram of the exploded structure of the folding assembly shown in FIG. 16, only one part of an internal structure of the first sliding groove 3011 in the shaft base 301 is drawn, and the other part may be symmetrical to the part. It should be understood that the foregoing figures are only some schematic diagrams of structures for showing features of the folding assembly, and the structure shown in the figure may have another variant. This is not specially limited in this embodiment of this application.

FIG. 17 is a schematic diagram of a structure of a folding assembly when the folding assembly is folded inward by 30° according to an embodiment of this application. FIG. 18 is a schematic diagram of a structure of a folding assembly in a fully folded state according to an embodiment of this application. With reference to FIG. 6, FIG. 17, and FIG. 18, the following describes a change of a position relationship between the shaft base 301, the door plate swing arm 304, the first housing 302, and the second housing 303 in a process in which the folding assembly provided in this embodiment of this application changes from an unfolded state to a folded state.

As shown in FIG. 6, when the folding assembly 30 is in an unfolded state, the door plate swing arm 304 and the upper surface of the shaft base 301 are in a fully attached state, an included angle between the wedge-shaped surface 3024 of the first housing 302 or the second housing 303 and the corresponding door plate swing arm 304 is the largest, and the first housing 302 or the second housing 303 can provide effective support for the door plate swing arm 304, to ensure structural stability.

As shown in FIG. 17, when the folding assembly 30 gradually changes from an unfolded state to a folded state, the door plate swing arm 304 rotates along the first sliding groove 3011 by using the first sliding groove 3011 as a fulcrum, so that an included angle is formed between the door plate swing arm 304 and the upper surface of the shaft base 301. Correspondingly, for the first housing 302 or the second housing 303, the first housing 302 or the second housing 303 moves relative to the corresponding door plate swing arm 304 under the action of the door plate swing arm 304, so that the wedge-shaped surface 3024 of the first housing 302 or the second housing 303 and the corresponding door plate swing arm 304 gradually approach each other.

As shown in FIG. 18, when the folding assembly 30 is in a fully folded state, an included angle formed between the door plate swing arm 304 and the upper surface of the shaft base 301 is in a largest state, and the wedge-shaped surface 3024 of the second housing 303 or the second housing 303 is fully attached to the corresponding door plate swing arm 304. A water drop shape or another required shape may be formed between the two door plate swing arms 304, so that a water drop screen can be formed after the folded flexible display screen 10 is folded, thereby improving a folding life.

In conclusion, in the folding assembly in this embodiment of this application, after the door plate structure and the swing arm structure are combined, a structure in which the door plate swing arm cooperates with the shaft base, the first housing, and the second housing can reduce a gap of each component in a folding movement process, and the structure is stable. Therefore, a folding life can be improved, the flexible display screen in an unfolded state can be effectively supported, the components can totally avoid each other in the movement process, and a form of the flexible display screen is maintained. Relative movement between the door plate swing arm and the shaft base is adjusted, so that the flexible display screen can achieve a desired bending curvature and shape, for example, a water drop screen. In addition, space utilization of the folding assembly can be improved, and a size of the folding assembly after being folded can be reduced. With reference to a state diagram that is shown in FIG. 18 and in which the folding assembly is in a fully folded state, a size A of the folding assembly after being folded is small in the figure, for example, may be less than 14 millimeters (mm).

In some embodiments, to implement synchronous movement of the door plate swing arms 304 on both sides of the shaft base 301, the folding assembly 30 shown in FIG. 6 may further include a synchronization mechanism. As shown in FIG. 19 to FIG. 23, the synchronization mechanism is located between the first housing 302 and the second housing 303, and a first swing arm 305 and a second swing arm 306 are respectively connected to both sides of the synchronization mechanism. A third sliding groove 3023 is disposed on each of the first housing 302 and the second housing 303, the first swing arm 305 is adapted to the third sliding groove 3023 on the first housing 302, and the second swing arm 306 is adapted to the third sliding groove 3023 on the second housing 303. When the door plate swing arm 304 rotates based on the shaft base 301, the first swing arm 305 slides along the third sliding groove 3023 on the first housing 302, and the second swing arm 306 slides along the third sliding groove 3023 on the second housing 303.

It may be understood that the third sliding groove 3023 adapted to the first swing arm 305 and the second swing arm 306 may also be disposed on the door plate swing arms 304 on both sides of the shaft base 301. This case should also fall within the protection scope of this application.

As shown in FIG. 19 to FIG. 23, both the first swing arm 305 and the second swing arm 306 may be disposed as plate-shaped structures, and the third sliding groove 3023 is a bar-shaped groove. When the first housing 302 is driven by the corresponding door plate swing arm 304 to rotate, the first housing 302 may drive the first swing arm 305 to rotate based on the synchronization mechanism, so that the first housing 302 slides along the first swing arm 305 under cooperation of the first swing arm 305 and the third sliding groove 3023. Correspondingly, under the action of the synchronization mechanism, the second swing arm 306 also rotates based on the synchronization mechanism, so that the first housing 302 is driven by the first swing arm 305 to rotate, and slides along the second swing arm 306. In this way, under the action of the synchronization mechanism, when the first housing 302 is folded inward, the second housing 303 may be synchronously folded inward; on the contrary, when the second housing 303 is folded inward, the first housing 302 may also be synchronously folded inward.

Specifically, the synchronization mechanism may include a first gear shaft 4011 and a second gear shaft 4012 that are symmetrically disposed, the first swing arm 305 is fixedly connected to the first gear shaft 4011, and the second swing arm 306 is fixedly connected to the second gear shaft 4012. A first gear 4013 is disposed on the first gear shaft 4011, a second gear 4014 is disposed on the second gear shaft 4012, and the first gear 4013 and the second gear 4014 mesh with each other by using a synchronization gear combination. For example, when the first housing 302 is folded inward, the first housing 302 may drive the first swing arm 305 to rotate. In this case, the first swing arm 305 performs rotation movement by using the first gear 4013 as a fulcrum and a center of a circle. During rotation, the synchronization gear combination may be driven to move, the synchronization gear combination drives the second gear 4014 to move, and the second gear 4014 drives the second gear shaft 4012 to rotate, to drive the second swing arm 306 to perform rotation movement, so that the first housing 302 and the second housing 303 are synchronously folded inward.

More specifically, the synchronization gear combination may include a first synchronization gear 4015 and a second synchronization gear 4016 that mesh with each other, the first synchronization gear 4015 meshes with the first gear 4013, and the second synchronization gear 4016 meshes with the second gear 4014. For example, when the first housing 302 is folded inward, the first housing 302 may drive the first swing arm 305 to rotate. In this case, the first swing arm 305 performs rotation movement by using the first gear 4013 as a fulcrum and a center of a circle. During rotation, the first gear 4013 may drive the first synchronization gear 4015 to move, the first synchronization gear 4015 drives the second synchronization gear 4016 to move, then the second synchronization gear 4016 drives the second gear 4014 to move, and the second gear 4014 drives the second gear shaft 4012 to rotate, to drive the second swing arm 306 to perform rotation movement, so that the first housing 302 and the second housing 303 are synchronously folded inward.

Optionally, to implement a fixed connection relationship between the first swing arm 305 and the first gear shaft 4011 and between the second swing arm 306 and the second gear shaft 4012, two spaced connecting rings 4017 may be disposed on each of the first swing arm 305 and the second swing arm 306, and the connecting ring 4017 is sleeved on the first gear shaft 4011 or the second gear shaft 4012, so that the first swing arm 305 and the second swing arm 306 are fixedly connected to the first gear shaft 4011 and the second gear shaft 4012 respectively by using the two spaced connecting rings 4017 each.

In addition, the first gear shaft 4011 between the two spaced connecting rings and the second gear shaft 4012 between the two spaced connecting rings 4017 are each sleeved with a damping spring 4018 and a damping cam 4019. In this structure, the damping spring 4018 generates friction force by squeezing the damping cam 4019, to form a movement damping effect, thereby improving structural stability and reliability of the folding assembly 30 in a rotation and folding process.

Figure 21:
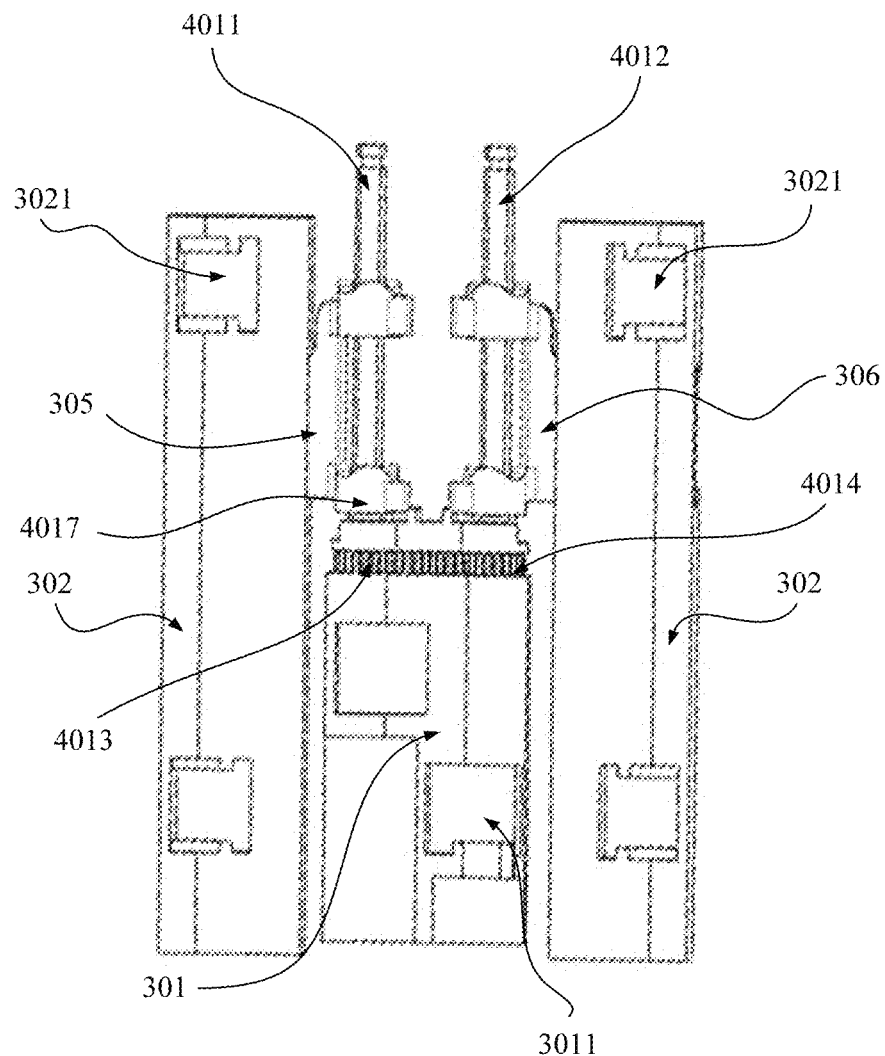
FIG. 21 is a schematic diagram of a top-view structure of a folding assembly existing after a synchronization mechanism is added according to an embodiment of this application.
Figure 22:
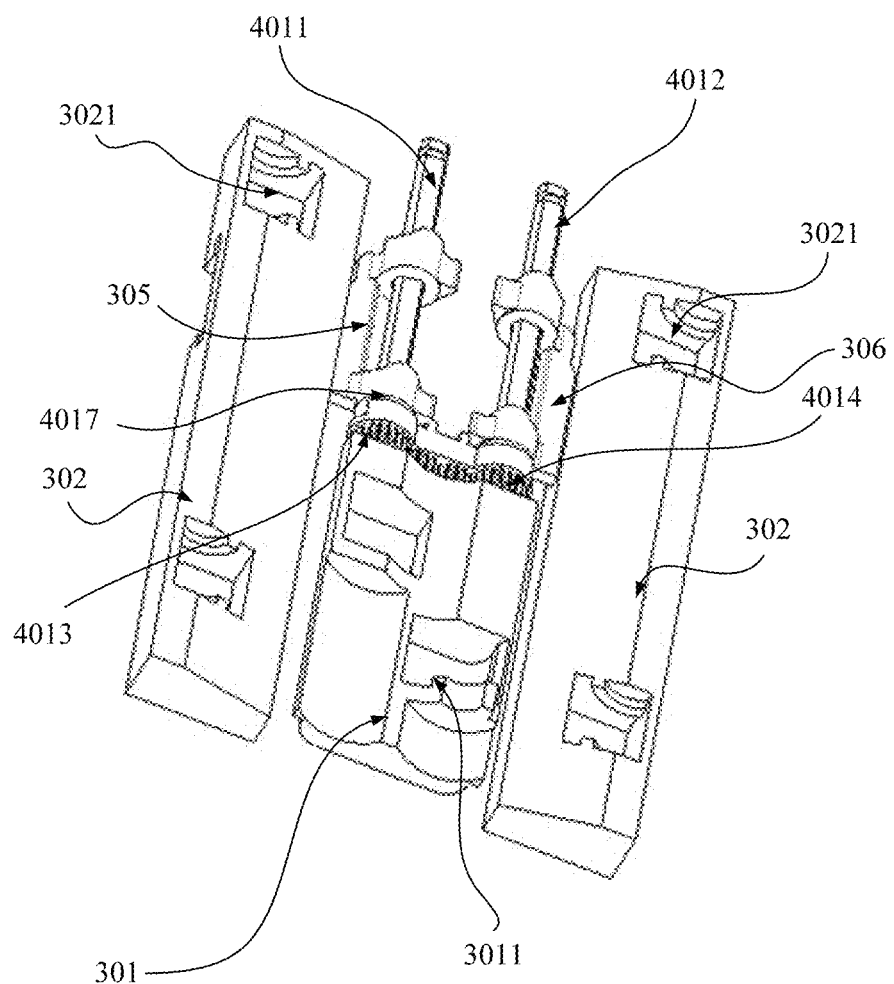
FIG. 22 is a schematic diagram of a three-dimensional structure of a folding assembly existing after a synchronization mechanism is added according to an embodiment of this application.
Figure 23:
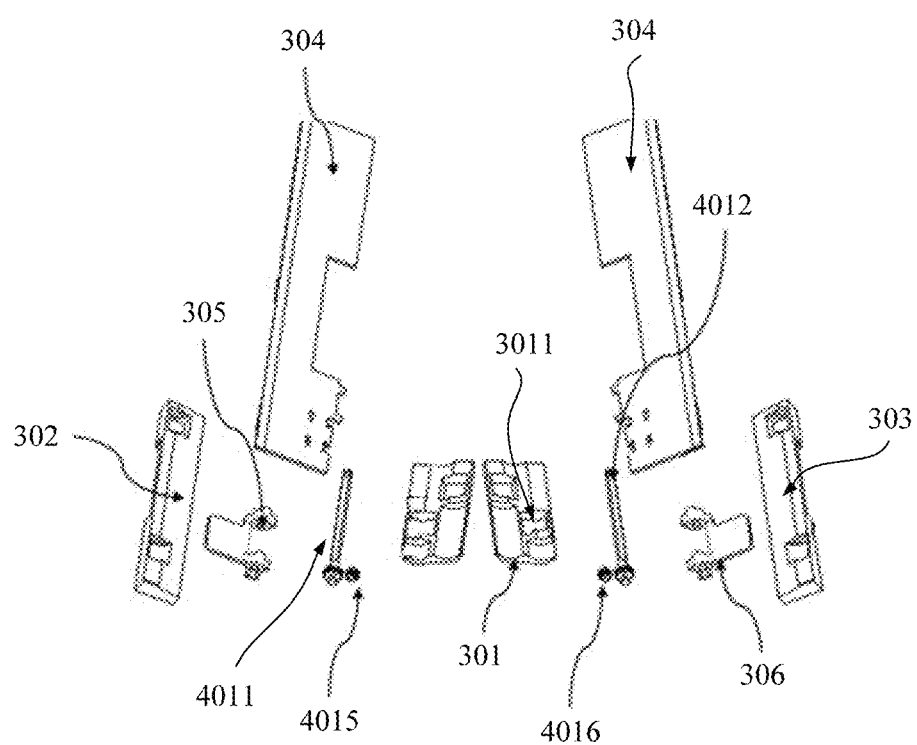
FIG. 23 is a schematic diagram of an exploded structure of the folding assembly shown in FIG. 22 existing after a synchronization mechanism is added.

It should be noted that, for ease of display, in the schematic diagrams of the folding assembly shown in FIG. 21 to FIG. 23, only one part of an internal structure of the first sliding groove 3011 in the shaft base 301 is shown, and the other part may be symmetrical to the part.

The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A folding assembly, applied to a foldable electronic device and configured to carry a flexible display screen, wherein the folding assembly comprises:
    a shaft base;
    a first housing; and
    a second housing, wherein the first housing and the second housing are respectively disposed on both sides of the shaft base; and
    a door plate swing arm is located above the shaft base and is disposed on each of both sides of a center line of the shaft base, one end of each door plate swing arm is rotatably connected to the shaft base, and the other end of each door plate swing arm is rotatably connected to the first housing or the second housing,
    wherein a first sliding groove is located on the shaft base and is disposed on each of both sides of the center line of the shaft base, first sliding rails adapted to the first sliding grooves on both sides of the center line of the shaft base are respectively disposed on the door plate swing arms on both sides of the shaft base, and when the door plate swing arm rotates based on the shaft base, the first sliding rail slides along the first sliding groove; and
    a second sliding groove is disposed on each of the first housing and the second housing, a second sliding rail adapted to the second sliding groove is disposed on each door plate swing arm, and when the door plate swing arm rotates based on the shaft base, the second sliding rail slides along the second sliding groove.

2. The folding assembly according to claim 1, wherein the shaft base serves as a fulcrum for the door plate swing arm.

3. The folding assembly according to claim 1, wherein the first sliding groove is an arc-shaped groove, a first arc-shaped boss is disposed on each of both side walls of the first sliding groove, a first arc-shaped recess adapted to the first arc-shaped boss is disposed on each of both sides of the first sliding rail, and when the first sliding rail slides along the first sliding groove, the first arc-shaped boss slides along the first arc-shaped recess.

4. The folding assembly according to claim 1, wherein both the first housing and the second housing are wedge-shaped structures, and when the folding assembly changes from an unfolded state to a folded state, a wedge-shaped surface of the first housing approaches a door plate swing arm connected to the first housing until the wedge-shaped surface is attached to the door plate swing arm, and a wedge-shaped surface of the second housing approaches the door plate swing arm connected to the second housing until the wedge-shaped surface is attached to the door plate swing arm.

5. The folding assembly according to claim 1, wherein the second sliding groove is an arc-shaped groove, a second arc-shaped boss is disposed on each of both sides of the second sliding groove, a second arc-shaped recess adapted to the second arc-shaped boss is disposed on each of both sides of the second sliding rail, and when the second sliding rail slides along the second sliding groove, the second arc-shaped boss slides along the second arc-shaped recess.

6. The folding assembly according to claim 1, wherein the folding assembly further comprises a synchronization mechanism, the synchronization mechanism is located between the first housing and the second housing, and a first swing arm and a second swing arm are respectively connected to both sides of the synchronization mechanism.

7. The folding assembly according to claim 6, wherein the synchronization mechanism comprises a first gear shaft and a second gear shaft that are symmetrically disposed, the first swing arm is fixedly connected to the first gear shaft, and the second swing arm is fixedly connected to the second gear shaft; and
    a first gear is disposed on the first gear shaft, a second gear is disposed on the second gear shaft, and the first gear and the second gear mesh with each other by using a synchronization gear combination.

8. The folding assembly according to claim 7, wherein the synchronization gear combination comprises a first synchronization gear and a second synchronization gear that mesh with each other, the first synchronization gear meshes with the first gear, and the second synchronization gear meshes with the second gear.

9. The folding assembly according to claim 7, wherein the first swing arm and the second swing arm are fixedly connected to the first gear shaft and the second gear shaft respectively by using two spaced connecting rings each, the first gear shaft between the two spaced connecting rings and the second gear shaft between the two spaced connecting rings are each sleeved with a damping spring and a damping cam.

10. The folding assembly according to claim 1, wherein the folding assembly further comprises a first swing arm and a second swing arm;
    a third sliding groove is disposed on each of the first housing and the second housing, the first swing arm is adapted to the third sliding groove on the first housing, and the second swing arm is adapted to the third sliding groove on the second housing; and
    when the door plate swing arm rotates based on the shaft base, the first swing arm slides along the third sliding groove on the first housing, and the second swing arm slides along the third sliding groove on the second housing.

11. A foldable electronic device, comprising a folding assembly and a flexible display screen attached to an upper surface of the folding assembly, wherein the folding assembly comprises:
    a shaft base;
    a first housing; and
    a second housing, wherein the first housing and the second housing are respectively disposed on both sides of the shaft base; and
    a door plate swing arm located above the shaft base and disposed on each of both sides of a center line of the shaft base, wherein one end of each door plate swing arm is rotatably connected to the shaft base, and the other end of each door plate swing arm is rotatably connected to the first housing or the second housing,
    wherein a first sliding groove is located on the shaft base and is disposed on each of both sides of the center line of the shaft base, first sliding rails adapted to the first sliding grooves on both sides of the center line of the shaft base are respectively disposed on the door plate swing arms on both sides of the shaft base, and when the door plate swing arm rotates based on the shaft base, the first sliding rail slides along the first sliding groove; and a second sliding groove is disposed on each of the first housing and the second housing, a second sliding rail adapted to the second sliding groove is disposed on each door plate swing arm, and when the door plate swing arm rotates based on the shaft base, the second sliding rail slides along the second sliding groove.

12. The folding electronic device according to claim 11, wherein the shaft base serves as a fulcrum for the door plate swing arm.

13. The folding electronic device according to claim 11, wherein the first sliding groove is an arc-shaped groove, a first arc-shaped boss is disposed on each of both side walls of the first sliding groove, a first arc-shaped recess adapted to the first arc-shaped boss is disposed on each of both sides of the first sliding rail, and when the first sliding rail slides along the first sliding groove, the first arc-shaped boss slides along the first arc-shaped recess.

14. The folding electronic device according to claim 11, wherein both the first housing and the second housing are wedge-shaped structures, and when the folding assembly changes from an unfolded state to a folded state, a wedge-shaped surface of the first housing approaches a door plate swing arm connected to the first housing until the wedge-shaped surface is attached to the door plate swing arm, and a wedge-shaped surface of the second housing approaches the door plate swing arm connected to the second housing until the wedge-shaped surface is attached to the door plate swing arm.

15. The folding assembly according to claim 11, wherein the second sliding groove is an arc-shaped groove, a second arc-shaped boss is disposed on each of both sides of the second sliding groove, a second arc-shaped recess adapted to the second arc-shaped boss is disposed on each of both sides of the second sliding rail, and when the second sliding rail slides along the second sliding groove, the second arc-shaped boss slides along the second arc-shaped recess.

16. The folding electronic device according to claim 11, wherein the folding assembly further comprises a synchronization mechanism, the synchronization mechanism is located between the first housing and the second housing, and a first swing arm and a second swing arm are respectively connected to both sides of the synchronization mechanism.

17. The folding electronic device according to claim 16, wherein the synchronization mechanism comprises a first gear shaft and a second gear shaft that are symmetrically disposed, the first swing arm is fixedly connected to the first gear shaft, and the second swing arm is fixedly connected to the second gear shaft; and a first gear is disposed on the first gear shaft, a second gear is disposed on the second gear shaft, and the first gear and the second gear mesh with each other by using a synchronization gear combination.

18. The folding electronic device according to claim 17, wherein the synchronization gear combination comprises a first synchronization gear and a second synchronization gear that mesh with each other, the first synchronization gear meshes with the first gear, and the second synchronization gear meshes with the second gear.

19. The folding electronic device according to claim 17, wherein the first swing arm and the second swing arm are fixedly connected to the first gear shaft and the second gear shaft respectively by using two spaced connecting rings each, the first gear shaft between the two spaced connecting rings and the second gear shaft between the two spaced connecting rings are each sleeved with a damping spring and a damping cam.

20. The folding electronic device according to claim 11, wherein the folding assembly further comprises a first swing arm and a second swing arm;

a third sliding groove is disposed on each of the first housing and the second housing, the first swing arm is adapted to the third sliding groove on the first housing, and the second swing arm is adapted to the third sliding groove on the second housing; and when the door plate swing arm rotates based on the shaft base, the first swing arm slides along the third sliding groove on the first housing, and the second swing arm slides along the third sliding groove on the second housing.

* * * * *